B. P. ROACH.
WAVE MOTOR FOR GENERATING POWER AND PROPELLING SHIPS.
APPLICATION FILED APR. 9, 1915.

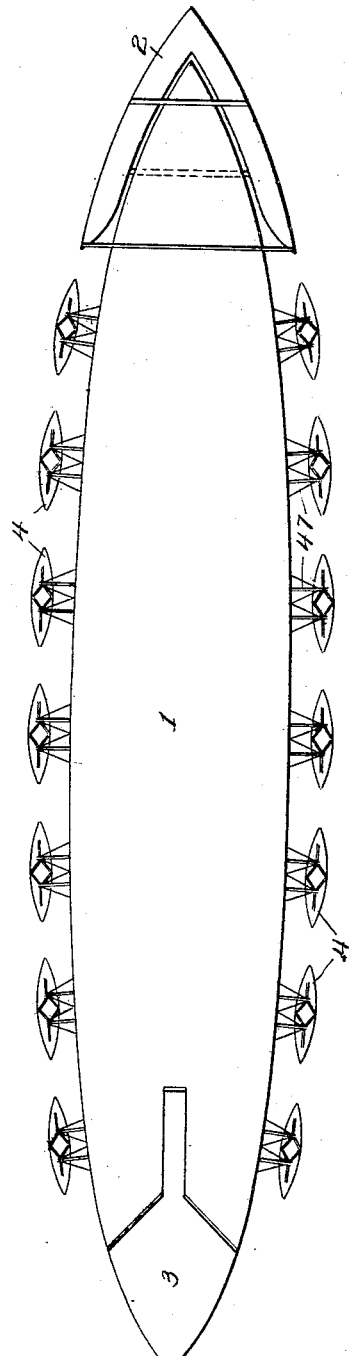
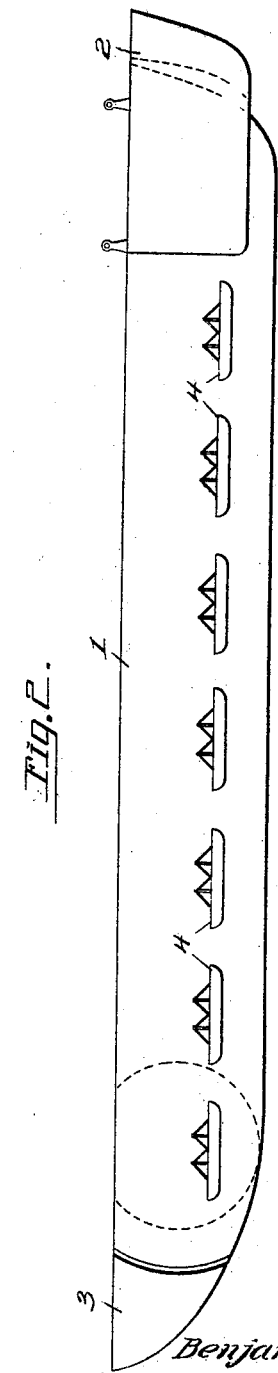

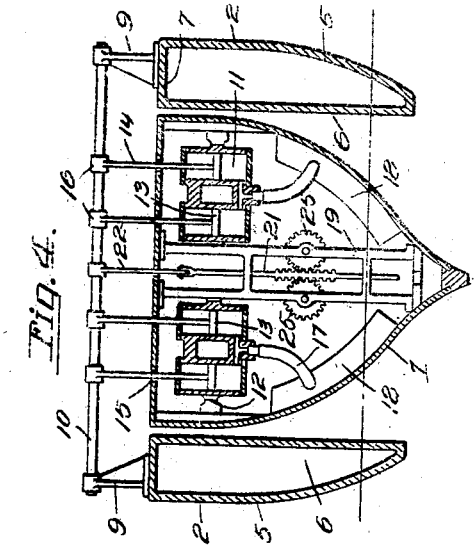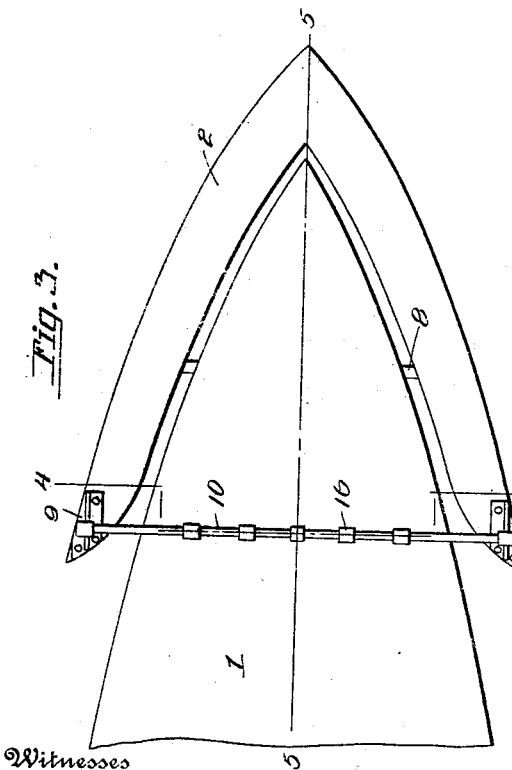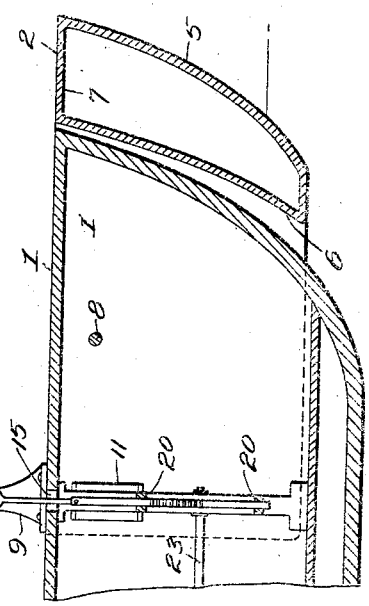

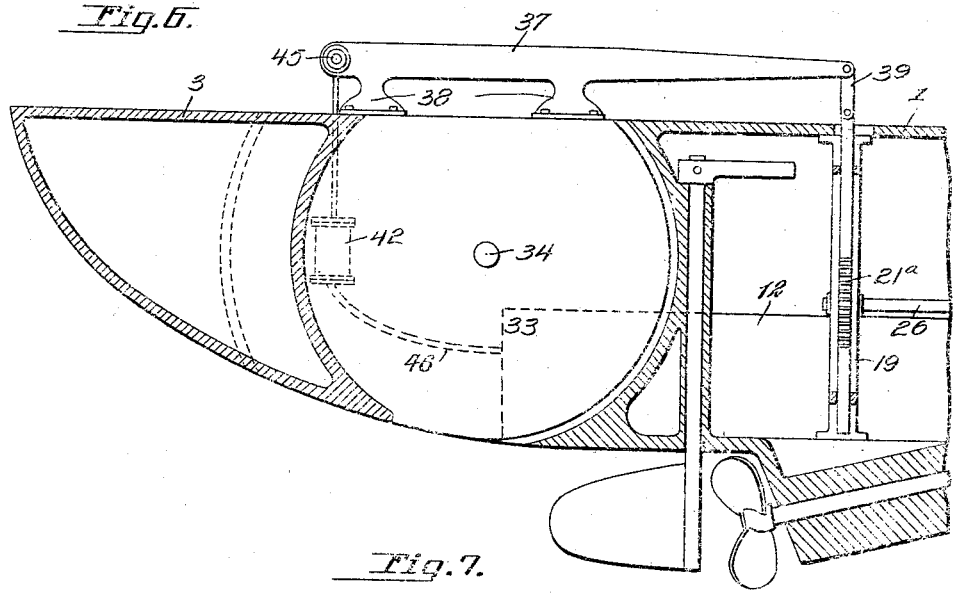
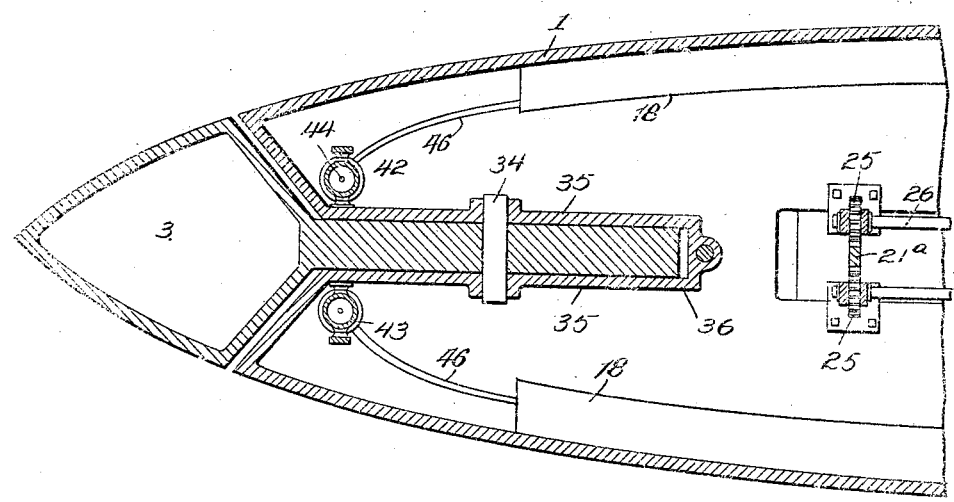

1,172,737.

Patented Feb. 22, 1916.
5 SHEETS—SHEET 4.

Witnesses
F. C. Gibson.
Jno G Armor

Inventor
Benjamin P. Roach.

By Victor J. Evans
Attorney

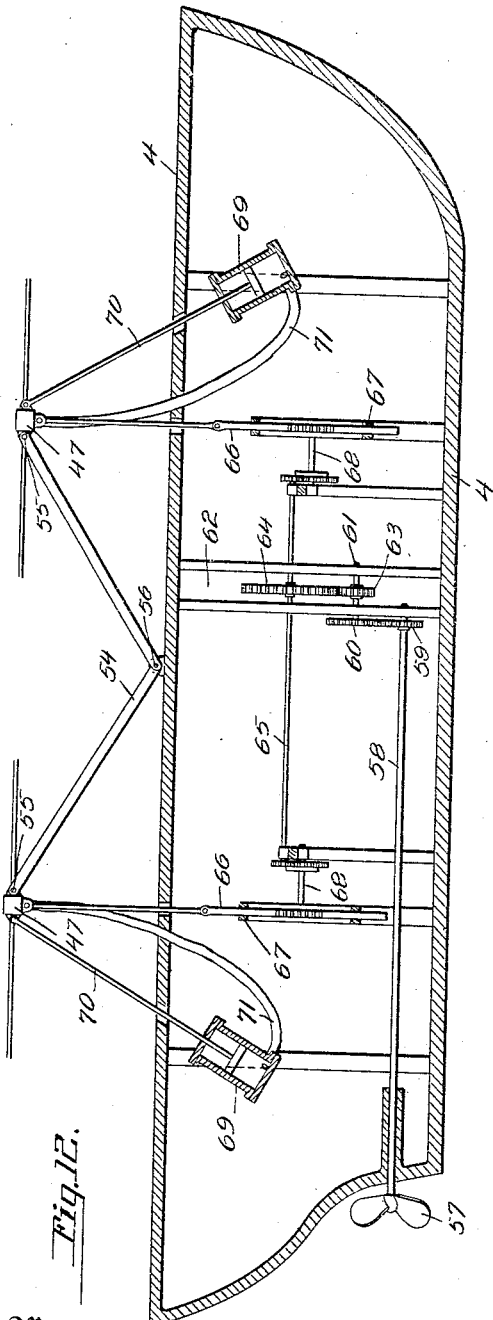
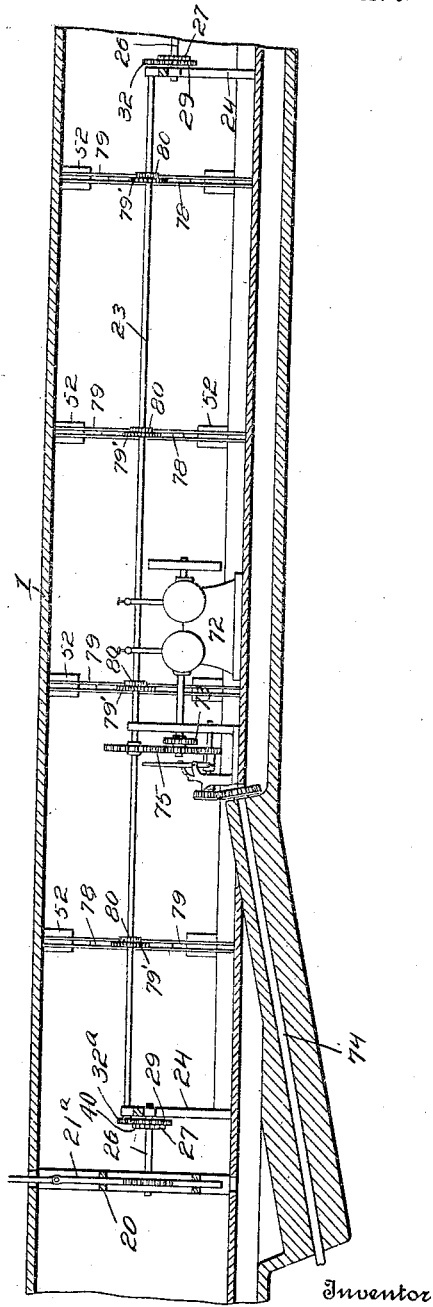

UNITED STATES PATENT OFFICE.

BENJAMIN P. ROACH, OF BERKELEY, CALIFORNIA.

WAVE-MOTOR FOR GENERATING POWER AND PROPELLING SHIPS.

1,172,737.　　　　Specification of Letters Patent.　　Patented Feb. 22, 1916.

Application filed April 9, 1915.　Serial No. 20,332.

*To all whom it may concern:*

Be it known that I, BENJAMIN P. ROACH, a citizen of the United States, residing at Berkeley, in the county of Alameda and State of California, have invented new and useful Improvements in Wave-Motors for Generating Power and Propelling Ships, of which the following is a specification.

This invention relates to improvements in ships and especially with reference to the provision of wave motors for utilizing the power of the waves for propelling ships in the open sea, one object of the invention being to provide an improved wave motor of this type which also acts as a float to reduce the motion of a ship in a seaway and protect the ship from the action of the waves; another object being to effect improvements in the construction of the ship by providing chambers in the sides thereof which become stored with compressed air by the action of the wave motors and utilize the compressed air to reduce the strain on the hull from outside pressure and to also protect the cargo which may be centrally stored.

With the above and other objects in view the invention consists in the construction, combination and arrangement of devices hereinafter described and claimed.

Figure 8:
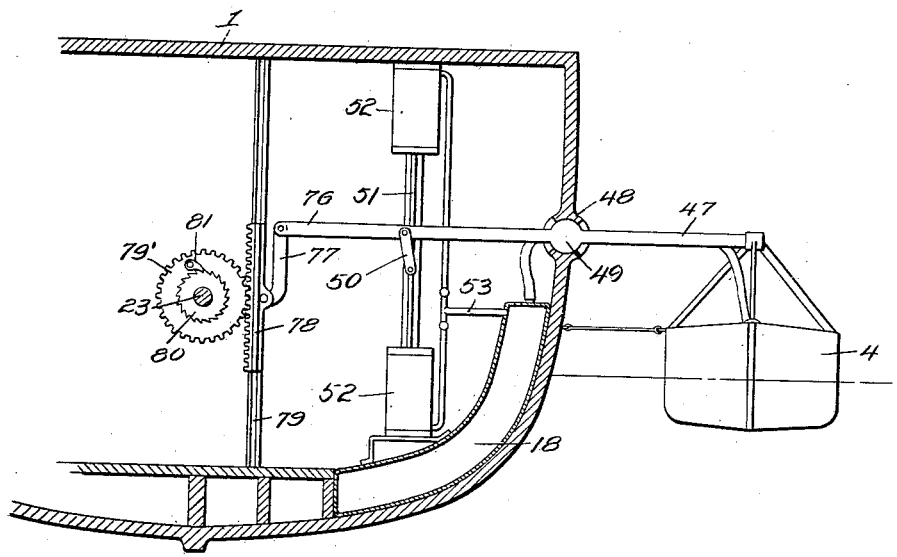
Figure 9:
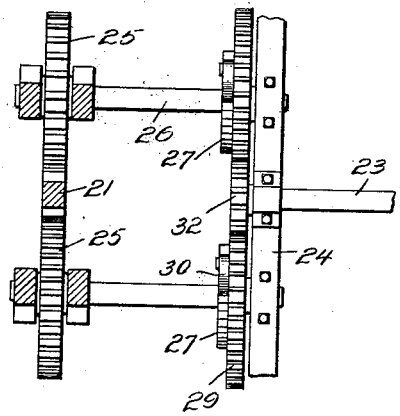
Figure 10:
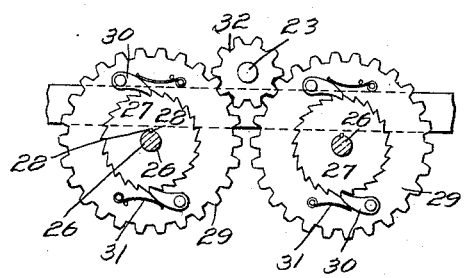

In the accompanying drawings:—Figure 1 is a deck plan of a ship provided with wave motors constructed in accordance with my invention. Fig. 2 is a side elevation of the same. Fig. 3 is a detail plan, on a larger scale, of the bow of the ship and also of the bow float. Fig. 4 is a vertical transverse sectional view on the plane indicated by the line 4—4 of Fig. 3. Fig. 5 is a longitudinal sectional view on the plane indicated by the line 5—5 of Fig. 3. Fig. 6 is a detail vertical central sectional view of the stern of the ship and of the stern float. Fig. 7 is a horizontal sectional view of the same. Fig. 8 is a detail transverse sectional view of the ship and showing one of the side floats in end elevation. Fig. 9 is a detail plan, partly in horizontal section of one of the transmission gears. Fig. 10 is a sectional view of the same. Fig. 11 is a vertical longitudinal sectional view of the central or intermediate portion of the ship. Fig. 12 is a longitudinal central sectional view of one of the side floats.

In accordance with my invention I provide a ship 1 with a bow float 2, a stern float 3 and also with side floats 4. The bow float 2 is V-shaped in plan so that it is arranged on opposite sides of the bow as well as directly in front of the bow of the ship and the said bow float is hollow, having outer walls 5, inner walls 6 and a deck or upper side 7. The pivoting shaft 8 extends transversely through the bow of the ship and engages bearings in the rearwardly extending and diverging wings of the bow float so that the latter is pivotally mounted at the bow of the ship and is adapted to swing in a vertical plane, by the force of the waves and the pitching motion of the ships.

Near the rear ends of the wings of the bow float are standards 9 which rise therefrom and are connected by a bar 10. This bar also extends above and across the bow of the ship and in the bow of the ship are pump cylinders 11 which are pivotally mounted as at 12 for vertical oscillating motion and are provided with suitable valves to control the admission of air thereto and the expulsion of compressed air therefrom. Air compressing pistons 13 are arranged for operation in said cylinders and are connected to the bar 10 by rods 14, said rods passing through slots 15 in the deck of the ship and being pivotally connected at their upper ends, as at 16 to said bar. Hence rocking motion of the bow float on its pivot 8 causes the pistons or plungers 13 to be operated in the cylinders 11 and to compress air in said cylinders. The compressed air is forced from said cylinders through suitable pipes 17 to compressed air storage tanks 18 which conform in shape to the sides of the ship and bear against the same. These tanks strengthen the construction of the ship and fortify it against the action of the waves.

A vertical frame 19 is arranged in line with the air compressors 11 and is provided with guides 20 for a vertically removable reciprocating rack bar 21 which is provided with rack teeth on both sides and has its upper end connected by a pitman 22 to the bar 10 so that said rack bar is also operated by the bow float. A power shaft 23 is connected to the rack bar 21 by a transmission gear such as shown in Figs. 8—10. Said power shaft is here shown as arranged longitudinally in the ship and mounted in bearings on suitable standards or frames 24.

The rack bar is engaged on opposite sides by a pair of spur gears 25 which are mounted on the frame 19 and each of which is provided with a shaft 26. Said shafts also have bearings in the standards or frames 24. A ratchet wheel 27 is keyed on each shaft 26 as at 28. A spur wheel 29 is loosely mounted on each shaft 26 and is provided with pawls 30 and also with springs 31 to engage said pawls with the ratchet wheels. Hence each gear 29 is adapted to turn in one direction on and independently of its shaft but is caused to revolve therewith in the opposite direction. The power shaft 23 is provided with a pinion 32 which engages the gears 29. Hence the transmission gears, which are operated by the reciprocating rack bar cause the power shaft to be revolved in one direction, as will be understood.

The stern float 3 is hollow and forms an overhang at the stern of the ship and is provided with a central, forwardly extending segmental arm 33 which is pivotally mounted as at 34 between the walls 35 of a vertical centrally arranged well 36 in the stern of the ship. Hence the stern float is also adapted to be rocked by the power of the waves and the pitching motion of the ship.

A beam 37, which is longitudinally arranged is secured as at 38 on the upper sides of the arm of the float and extends forwardly over the stern of the ship and has its front end connected by a pitman 39 to the upper end of a vertically movable reciprocating rack bar 21ª which is identical in construction with the bar 21 and operates a transmission gear 40 which is identical in construction with the transmission gear hereinbefore described and the gears 29 of which are engaged with a pinion 32ª at the rear ends of the power shaft 23. Hence the stern float also operates the power shaft.

Air compressors 42 are arranged in the stern of the ship, and are here shown as comprising oscillating cylinders 43 and plungers which are operated by rods 44, pivotally connected as at 45 to the beam. Pipes 46 connect the air compressors with the tanks 18. Hence the movements of the float 3, caused by the motion of the waves and the pitching of the ship cause the shaft 23 to be driven and also cause air to be compressed and stored in the tanks 18.

In connection with each side float 4 I provide the ship with a pair of bars 47 which extend through the sides of the ship and are mounted therein for vertical swinging movement, the ship's sides being here shown as provided with sockets 48 and the bars being shown provided with balls 49 arranged in said sockets. The inboard end of each bar is connected by a pitman 50 to the rod 51 of air compressing pumps 52 which pumps are connected to the tank 18 by valved pipes 53. The outboard ends of each pair of bars 47 are connected together by two pairs of link bars 54, said link bars being pivotally connected to the bars 47 as at 55 and being pivotally connected together and also pivotally connected to the center of one of the side floats 4 as at 56. Hence the side floats are connected to the ship and yet adapted to pitch independently of the ship.

Each side float has a propeller 57 the shaft 58 of which has a gear 59 which is engaged with a gear 60 on a shaft 61. The propeller shaft and the shaft 61 have bearings in stanchions or a frame 62 and said shaft 61 also has a gear 63. Said gear is engaged by a gear 64 on a shaft 65. Rack bars 66 which are similar in construction to the rack bars hereinbefore described operate in guides 67 in the side floats and are connected by transmission gears 68 to the shaft 65. Said transmission gears are also identical in construction with those hereinbefore described. The pitching motion of the side floats causes their propellers to be operated and hence the side floats assist in the propulsion of the ship. Each side float is also provided with air compressors 69 which are similar to the air compressors hereinbefore described and the plunger rods 70 of which are connected to the bars 47. Hence said air compressors are also operated by the pitching movement of the side floats. Said air compressors are connected by flexible pipes 71 to the air tank 18 and hence assist in charging said air tanks.

A suitable engine, driven by compressed air, and here diagrammatically illustrated at 72 is connected to the air tanks 18 and supplied by compressed air therefrom and is connected by suitable gears 73 to the propeller shaft 74 of the ship. The shaft of said engine is also connected by gears 75 to the shaft 23 so that the power transmission mechanisms which are operated by the bow and stern and side floats also assist in propelling the ship. A suitable steam or other engine may also be connected to a propeller shaft and used as an auxiliary to my improved wave motors in propelling the ship.

It will be understood that by means of my invention the motion of the waves and the pitching movement of the ship may be utilized in propelling the ship. The floats of the wave motors add greatly to the stability of the ship and lessen and minimize pitching and rolling thus avoiding seasickness and relieving strains on the hull. Moreover the air storage tank in the sides of the ship strengthens the same and fortifies it against the action of the waves.

In the present instance, the inner ends of the bars 47 actuated by the side floats 4 are connected with the power shaft 23 and the bars 47 at one side of the ship are adapted to impart power to the shaft 23 as such bars move in one direction and to idle relatively to the shaft when moving in the opposite direction. Thus, power is imparted to the shaft 23 from the side floats 4 in the movement thereof, while the power shaft tends to regulate the speed of the pumps relatively to one another and to insure the uniform action of such pumps. In this instance, the connecting mechanism between each bar 47 and the shaft 23 comprises an arm 76 formed integral with or otherwise connected to the inner end of the arm 47 and disposed in a horizontal plane and adapted to swing with the bar and having the inner end thereof connected by means of a link 77 with a rack bar 78 mounted for vertical sliding movement within guides 79 suitably fastened in position within the ship and disposed in parallelism. The rack bar 78 meshes with a pinion 79' loosely mounted upon the shaft 23 and fixed upon the shaft 23 adjacent to the pinion 79' is a ratchet wheel 80, while engaging the teeth of the ratchet wheel 80 is a dog 81 carried by the adjacent face of the pinion 79'. Thus, as the arm 76 is swung in one direction, the rack bar 78 is moved within the guide 79 to rotate the pinion 79' in one direction and in this movement of the pinion the dog 81 engages the adjacent tooth of the ratchet wheel 80 with the effect of revolving such ratchet wheel and the shaft. On the other hand, when the arm 76 is swung in the opposite direction under the action of the bar 47 the rack bar 78 is moved in the reverse direction in the guide 79, thereby rotating the pinion 79' in the opposite direction and in this movement of the pinion the dog 81 idles over the teeth of the ratchet wheel and so relieves the shaft of the influence of the arm. The dogs and ratchet wheels under the influence of the arms at one side of the ship are arranged to act reversely to the dogs and ratchet wheels controlled by the arms at the opposite side of the ship so that continuous rotary movement will be imparted to the power shaft.

Having thus described my invention, I claim:—

1. A ship having an operating bar connected thereto for angular movement and extending inboard and also extending outboard, an engine arranged in the ship and having a movable element connected to and actuated by the inboard portion of the said bar, a float arranged without the ship and connected to the outboard end of said bar for angular movement with said bar and a float-carried engine having a movable element connected to and actuated by said bar.

2. A ship having an operating bar connected thereto for angular movement and extending inboard and also extending outboard, a fluid compressing engine arranged in the ship and having a movable element connected to and actuated by the inboard portion of the said bar, a float arranged without the ship and connected to the outboard end of said bar for angular movement, a float carried fluid compressing engine having a movable element connected to and actuated by said bar and propelling means for the ship actuated by the fluid compressed by said engines.

3. A ship having a float at the bow thereof said float being substantially V-shaped in plan, arranged on opposite sides of the bow as well as directly in front of the bow and being pivotally connected to the ship and capable of vertical angular movement with reference to the ship.

4. A ship having a float at the stern thereof, said float having a forwardly extending segmental arm, and said ship having a vertically arranged well in the stern thereof, the said segmental arm of the float being arranged between the walls of said well and pivotally mounted so that the float is arranged for vertical angular movement with respect to the ship.

In testimony whereof I affix my signature in the presence of two witnesses.

BENJAMIN P. ROACH.

Witnesses:
LORRETA CARLSON,
A. MARTIN KEELER.